Oct. 6, 1925.

H. PEARCE

PET COCK

Filed Jan. 30, 1924

1,556,303

INVENTOR.

Herbert Pearce

BY Rex Frye

ATTORNEY.

Patented Oct. 6, 1925.

1,556,303

UNITED STATES PATENT OFFICE.

HERBERT PEARCE, OF DETROIT, MICHIGAN.

PET COCK.

Application filed January 30, 1924. Serial No. 689,412.

*To all whom it may concern:*

Be it known that I, HERBERT PEARCE, a citizen of the United States, and resident of Detroit, in the county of Wayne and State of Michigan, have invented new and useful Improvements in Pet Cocks, of which the following is a specification.

This invention relates to pet-cocks and has for its principal object the provision of a simple, practical and comparatively inexpensive pet-cock that is automatically maintained in closed position whenever the plunger is released.

Another object of the invention is the construction of a pet-cock especially adapted for use as a gage cock upon the oil chambers of Ford automobiles and the like, and which can be opened without necessitating the driver reaching under the car.

Other objects and advantages will be apparent from the following description, wherein reference is made to the accompanying drawings illustrating a preferred embodiment of my invention and wherein similar reference numerals designate similar parts throughout the several views.

Figure 1:
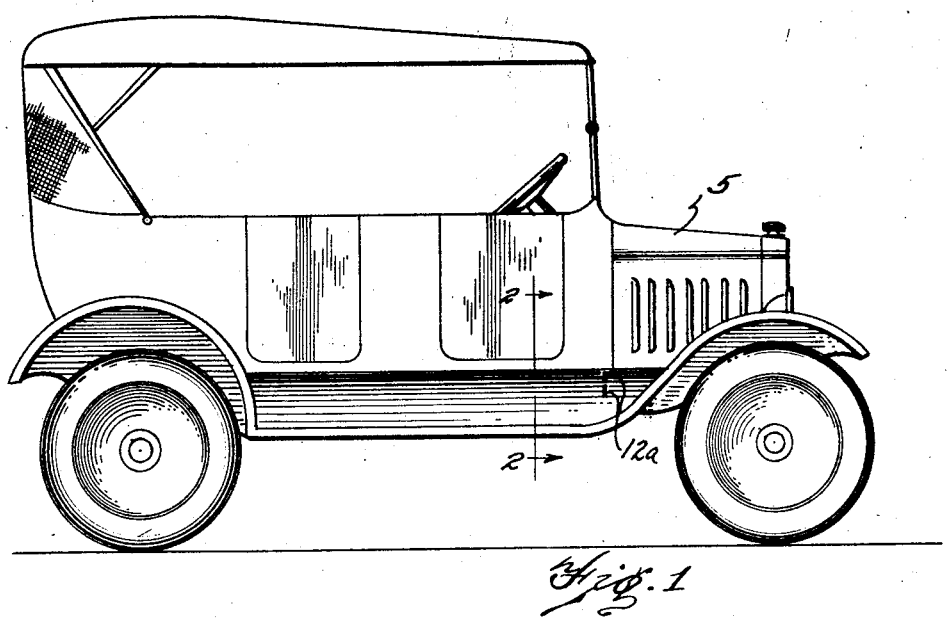
Fig. 1 is a side view of an automobile having a pair of my improved pet-cocks in position for use as gage cocks upon the oil chamber.
Figure 2:
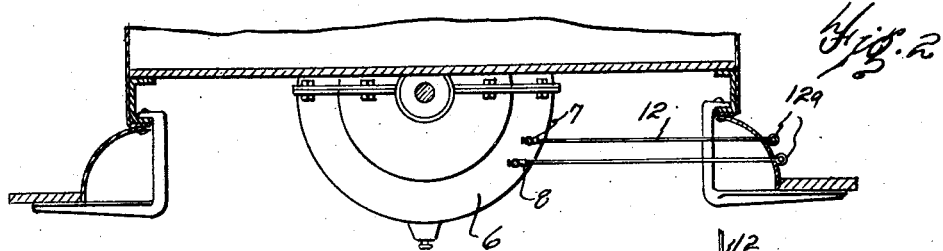
Fig. 2 is a detail sectional view taken substantially on the line 2—2 of Fig. 1.
Figure 3:
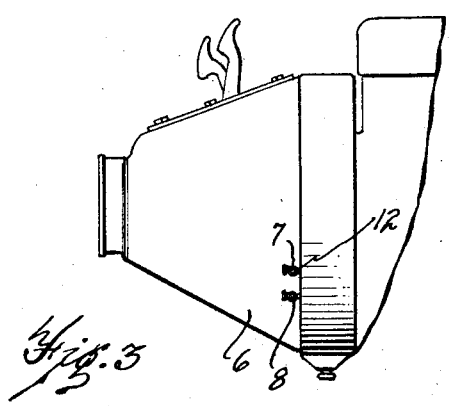
Fig. 3 is an enlarged detail side elevation of the oil chamber with the pet-cocks in position thereon.

Referring now to the drawings, the numeral 5 designates an automobile having a crank case oil chamber 6 below the engine for the reception of lubricating oil in the usual manner of automobile engines. In the illustrated embodiment I have shown the type of crank case now utilized on Ford automobiles, and have positioned a pair of my improved pet-cocks 7 and 8 in the usual position of the gage cocks now utilized for indicating whether the oil in the crank case is above the desired level. Thus, the uppermost pet-cock 7 may be opened, and if oil runs out therethrough it is evident that the oil level is sufficiently high. Should no oil flow through the upper pet-cock 7, the lower pet-cock 8 is then opened. If oil flows through the lower pet-cock, it is evident that sufficient oil is in the crank case to lubricate the engine for a short time, but that more oil should be inserted soon. Should it happen that no oil flows through the lower pet-cock, it is apparent that the oil level is dangerously low and more oil should be immediately put into the crank case.

The present type of pet-cock now used on the Ford crank case necessitates the driver reaching under the body of the car and turning the pet-cock. This is a messy operation at best, and at times is particularly disagreeable. By the use of my improved pet-cock the driver can open either or both of the gage cocks while standing beside the car, thus avoiding the disagreeable aspects of oil gage inspection.

Figure 4:
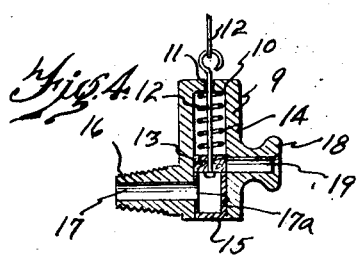
Fig. 4 is a longitudinal sectional view through the pet-cock.

In Fig. 4 I have illustrated in section the construction of my improved pet-cock. The body portion 9 is preferably formed with a bore 10 extending longitudinally through almost its entire length, whereby a long accurately cut opening is arranged with one end open and the opposite end closed by a light wall adapted to be perforated, as at 11, for the passage of a plunger stem 12. In this bore is arranged a plunger 13 of leather or other suitable packing material shaped to snugly fit against the wall of the bore but slidable therein against the tension of a coil spring 14 surrounding the plunger stem and with its ends contacting the plunger 13 and the end wall 14 respectively. The open end of the bore 10 is adapted to be closed by a cylindrical cap 15 substantially as shown in Fig. 4, the cap being of such diameter as to tightly engage the wall of the bore 10 so that it must be driven into position and cannot be accidentally shaken out of position. The cylindrical wall of the cap 15 is of sufficient thickness to form a seat for the plunger 13, and the plunger is normally maintained in flush contact with the open end of the cap so as to close the cap to prevent the flow of liquid therethrough at all times except when the plunger is being held away from the cap 15 by manual exertion sufficient to overcome the pressure of the spring 14.

The inlet portion 16 of the pet-cock is threaded in the conventional manner and preferably has its opening 17 cut therein after the cap 15 has been positioned in the bore 10. By so doing I eliminate any possibility of improper alignment between the inlet opening 17 and the hole 17ª cut in the side of the cap 15. Should die-castings be utilized for the body portion of the petcock, the inlet opening 17 may be cast therein for the major portion of its length, and the small remaining wall be drilled and reamed simultaneously with the cutting of the hole 17ª in the side wall of the cap 15 after the cap has been positioned in the bore 10.

The spout 18 is arranged forwardly of the inlet portion 17 so that the outlet port 19 opens into the bore 10 in advance of the cap 15, whereby the plunger 13 normally shuts off the flow of liquid through the bore before it reaches the outlet port 19. The plunger stem 12 may be of any desired length and is preferably formed with a ring 12ª at its free extremity, or some other means for convenient manipulation. Or the plunger stem may terminate shortly in advance of the pet-cock, as shown in Fig. 4, and suitable connecting means applied thereto should an extension be needed.

The illustrated embodiment has accentuated the desirability of the use of my petcock as a gage cock on Ford cars, but it is to be understood that this is only for the purpose of exemplification, and that my pet-cock is adapted for use in practically every place where the ordinary pet-cock is, or may be, used.

Having described my invention, I claim

A pet-cock comprising a body portion having a bore extending longitudinally therethrough for almost its entire length, a perforated end wall closing one end of the bore, a cylindrical cap fitting into and closing the other end of the bore and having an inlet aperture in its periphery, an inlet portion having a passageway aligning with the peripheral aperture in the cap, a spout having an outlet port opening into the bore in advance of and adjacent the open end of the cap, a plunger snugly fitting against the wall of the bore, a plunger stem extending through the perforation in the end wall of the body portion, and a spring arranged in the bore and engaging the plunger to normally press the plunger into position to simultaneously close the open end of the cap and the outlet port of the spout.

In witness whereof I hereunto set my hand.

HERBERT PEARCE.